United States Patent Office 3,382,300
Patented May 7, 1968

3,382,300
DILOWERALKYL ACETAMIDOETHYL
PHOSPHORODITHIOATES
Yoshio Uchiyama and Yoshikatsu Arima, Takaoka-shi,
Kanji Taniguchi, Fujisawa-shi, Nobuo Sato, Koganei-shi, and Mitsuo Asada, Hiratsuka-shi, Japan, assignors
to Nippon Soda Kabushiki Kaisha, Chiyoda-ku, Tokyo-to, Japan, a company of Japan
No Drawing. Filed Dec. 31, 1964, Ser. No. 422,522
3 Claims. (Cl. 260—944)

ABSTRACT OF THE DISCLOSURE

Compounds of the formula

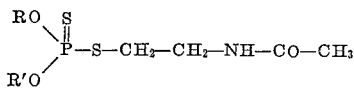

in which R and R' each represents an alkyl radical, which compounds are useful as insecticides and acaricodes.

---

This invention relates to novel acetamidoethyl phosphorodithioates having high pesticidal activity and to a process for the preparation of the same. More specifically, the invention relates to insecticidal and acaricidal compositions containing one or more of the novel compounds and further includes methods for combatting insect pests with the same compositions.

The novel compounds which are provided by this invention are O.O-dialkyl S-(2-acetamidoethyl) phophorodithioates of the general formula

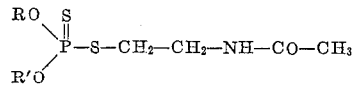

wherein R and R' represent lower alkyl radicals.

A number of argono phosphate insecticides have been used for the control of many common agricultural pests and certain materials are known to be effective as systemic insecticides against insect pests which feed on plants. However, many of these systemic insecticides are relatively or very highly toxic to human and other warm-blooded animals in handling or use. Intending to provide practically useful systemic insecticides of low mammalian toxicity, the numerous derivatives of substituted-amindoethyl phosphorus esters were synthesized and assayed with respect to several biological activities thereof.

Now, it has been found that the aforesaid novel compounds of the present invention are highly effective and selective systemic insecticides and acaridides with high systemic action against insect pests including scale insects, aphids, leaf hoppers and spider mites attacking orchard and field crops or other living plants.

Furthermore, it is to be noted that the mammalian toxicity of these compounds is markedly reduced in comparison with many other organophosphorus systemic insecticides. The lowest mammalian toxic compound of the series is O.O-dimethyl S-(2-acetamidoethyl) phosphorodithioate, for which the acute oral LD 50 for mice of 300 mg./kg. For the O.O-diethyl S-(2-acetamidoethyl) phosphorodithioate, the corresponding figure is 175 mg./kg. In respect of the former compound, it is sufficiently low in toxicity to permit consideration for its systemic uses in the veterinary field to control parasites by being fed to animals.

The compounds of the present invention are prepared, by the reaction of following reaction.

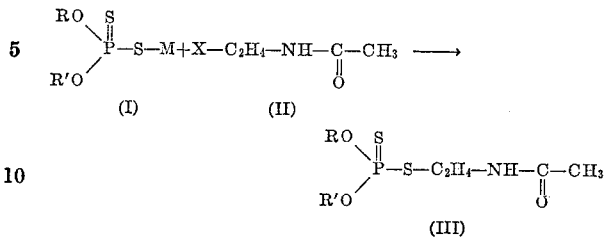

In the formula, R and R' are lower alkyl groups such as methyl, ethyl, isopropyl and n-propyl, M is selected from the group consisting of alkali metal atoms and ammonium group and X is selected from the group consisting of chlorine atom, bromine atom, methane sulfonic acid residue and 4-toluene-sulfonic acid residue.

The compounds (II) in which X is chlorine atom are known in the literature, but the others are novel compounds.

1-acetamido-2-bromethane (Compound (II), in which X is Br) can be prepared by the analogous process for preparation of 1-acetamido-2-chlorethane (II, whereas X is Cl). 2-acetamidoethyl methanesulfonate (Compound (II), in which X is $OSO_2CH_3$) and 2-acetamidoethyl 4-tolenesulfonate (Compound (II) in which X is $$OSO_2C_6H_4CH_3\text{-}(4))$$

can be prepared by the reaction of 2-acetamidoethanol with methanesulfonyl chloride and 4-toluenesulfonyl chloride respectively.

The process of the present invention is carried out generally as follows:

The Compound (I) and the Compound (II) are mixed in approximate equimolar proportions in a suitable inert solvent and are agitated. As an inert solvent, hydrocarbons, hydrocarbon halides, alcohols, esters, ketones, nitriles and ethers are preferably employed. The reaction temperature should be between 40° C. and 100° C. and the reaction is terminated in 15 hours or less.

After the reaction is terminated, the reaction mixture is cooled to room temperature and the salts precipitated during the reaction are filtered off. Then, the solvent is distilled off, and to the residue water is added to remove the unreacted portion of the reactants as an aqueous solution. The oil layer is diluted with benzene, and this solution is thoroughly washed by water and dried, then the solvent is distilled off. Subsequently, the solution is distilled under high vacuum, the components distilled at temperatures of the heating bath of 100° C.~120° C. are removed and then the desired product is obtained as a yellow viscous oil.

The following non-limiting examples illustrate more precisely the present invention.

Example I.—(Compound A)

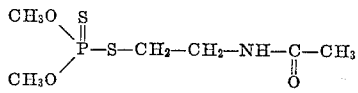

A mixture of 29 g. of ammonium dimethyl phosphorodithioate in 150 ml. of chloroform was refluxed with agitation, and a solution of 20 g. of 1-acetamido-2-chloroethane in 20 ml. of chloroform was added dropwise. After completion of the addition, the mixture was refluxed with agitation for 6 hrs. Then, the mixture was cooled to room temperature and filtered to remove the precipitate of ammonium chloride formed during the reaction, and the solvent was distilled off. The residue was poured into 50 ml. of water, and oil layer was extracted with 50 ml. of benzene. The benzene solution was washed twice with 20 ml. of water and dried over anhydrous magnesium sulfate. The dried solution was distilled under a reduced pressure to remove benzene. The residue was retained at 110° C. under 0.1 to 0.2 mm. Hg of vacuum to remove volatile components. Thus, 18.1 g. of light yellowish orange oil was obtained.

The product was purified through active carbon-benzene column chromatography.

Refractive index: $n_D^{20}=1.5369$.

Analysis.—Calculated for $C_6H_{14}NO_3PS_2$: C, 29.63%; H, 5.76%; N, 5.76%; P, 12.76%; S, 26.35%. Found: C, 29.68%; H, 5.94%; N, 5.94%; P, 12.76%; S, 26.20%.

Example II.—Compound A

Similarly to Example I, 12 g. of ammonium dimethyl phosphorodithioate was reacted with 11 g. of 1-acetamido-2-bromethane in 60 ml. of chloroform, and 6 g. of light yellowish oil, refractive index $n_D^{20}=1.5390$, was obtained.

Analysis.—Calculated: N, 5.76%; P, 12.76%; S, 26.36%. Found: N, 5.28%; P, 12.76%; S, 26.52%.

Example III.—Compound A

To a refluxed solution of 15 g. of sodium dimethyl phosphorodithioate in 50 ml. of methanol a solution of 10 g. of 1-acetamido-2-chlorethane in 10 ml. of methanol was added dropwise. After completion of the addition, the mixture was refluxed with agitation for 2 hrs., then cooled to room temperature, and filtered to remove precipitate formed during the reaction.

The residue, obtained from the filtrate by removing of methanol, was treated similarly to Example I, and 5.8 g. of oil, refractive indext $n_D^{20}=1.5406$, was obtained.

Example IV.—Compound B

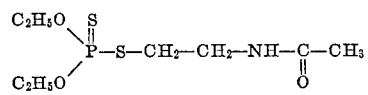

To a refluxed solution of 27 g. of ammonium diethyl phosphorodithioate in 100 ml. of methanol, a solution of 18 g. of 1-acetamido-2-chlorethane in 20 ml. of methanol was added dropwise. After completion of the addition, the mixture was refluxed with agitation for one hour, then cooled to room temperature, precipitated ammonium chloride was filtered off, and methanol was distilled off. The residue was dissolved in 100 ml. of benzene, and the solution was washed with water and dried over anhydrous mangnesium sulfate. Benzene was distilled from the dried solution under a reduced pressure, and the residue was retained under 0.1 to 0.2 mm. Hg of vacuum at a heating bath temperature of 110° C. to remove volatile components. Thus, 17 g. of light yellow oil was obtained.

Refractive index: $n_D^{25}=1.5321$.

Analysis.—Calculated for $C_8H_{18}NO_3PS_2$: N, 5.18%; P, 11.48%; S, 23.70%. Found: N, 5.19%; P, 11.50%; S, 23.45%.

Example V.—Compound A 16 g. of methanesulfonyl chloride was added portionwise to a solution of 13.2 g. of 2-acetamidoethanol in 250 ml. of chloroform, and the mixture was refluxed with agitation for 11 hrs. Hydrogen chloride gas was evolved during the reaction.

After completion of the reaction, chloroform was distilled off and the residue was retained under 5 mm. Hg of vacuum on a steam bath to remove the volatile components. 27 g. of oily product, 2-acetamidoethyl methanesulfonate, was obtained.

The oily product was added to a solution of 26.3 g. of ammonium dimethyl phosphorodithioate in 60 ml. of chloroform. The mixture was refluxed for 6 hrs., then was treated similarly to the process of Example I. 6 g. of O.O-dimethyl S-(2 - acetamidoethyl)phosphorodithioate ($n_D^{20}=1.5427$) are obtained.

Analysis.—Calculated for $C_6H_{14}NO_3PS_2$: N, 5.76%; P, 12.76%; S, 26.35%. Found: N, 6.16%; P, 13.33%; S, 25.75%.

Example VI.—Compound A 20 g. of 4-toluenesulfonyl chloride was added to a solution of 11.3 g. of 2-acetamidoethanol in 15 ml. of chloroform, and the mixture was refluxed for 7 hrs., then chloroform was distilled off.

To the viscous oily residue, 30 ml. of benzene was added and the mixture was refluxed for 5 to 10 minutes, then the upper benzene layer was decanted the oil layer remaining. This operation is repeated four times. The oil layer was retained on a steam bath under a reduced pressure to remove benzene completely. Then, 26 g. of oil ($n_D^{20}=1.5222$) was obtained as a residue.

This oil was added to a solution of 17.5 g. of ammonium dimethyl phosphorodithioate in 50 ml. of chloroform, and the mixture was refluxed with agitation for 6 hrs., and treated similarly to the process described in Example I. 5 g. of O.O-dimethyl S-(2-acetamidoethyl)phosphorodithioate ($n_D^{25}=1.5428$) was obtained.

Analysis.—Calculated for $C_6H_{14}NO_3PS_2$: N, 5.76%; P, 12.76%; S, 26.35%. Found: N, 5.76%; P, 12.30%; S, 25.98%.

In order that the novel compounds prepared in the above mentioned process may be provided for practical purposes, those compounds must be formulated in various types of compositions, for example, dusts, granules, emulsifiable concentrates, wettable powders and aerosols etc., which can be used conveniently. The following examples illustrate the preparation and use of the compositions containing the novel compounds of this invention and the results obtainable through their use but it should be understood that these examples are intended to be merely illustrative of the present invention and are not to be construed as limiting the same.

Example VII

The following composition is formulated as an emulsifiable concentrate by dissolving the active ingredient in a solvent together with a surface-active agent.

| | Percent |
|---|---|
| O.O-dimethyl S-(2-acetamidoethyl) phosphorodithioate (Compound A) | 50 |
| Xylene | 43 |
| Polyoxyethylene alkyl aryl ether | 7 |

This composition is diluted with water to give an aqueous emulsion suitable for use in accordance with the invention.

Example VIII

A wettable powder having the following composition can be prepared by grinding together a mixture of the active ingredient, an inert diluent and a surface active agent and a dispersing agent.

| | Percent |
|---|---|
| O,O-diethyl S-(2-acetamidoethyl)phosphorodithioate (Compound B) | 50 |
| Diatomaceous earth | 43 |
| Polyoxyethylene alkyl aryl ether | 6 |
| Sodium lignin sulfonate | 1 |

This composition is diluted with water to give an aqueous dispersion suitable for use in accordance with the invention.

Example IX

The following dust formulation can be prepared by blending a mixture of the active ingredients and inert diluent together and then grinding to form a homogeneous powder.

| | Percent |
|---|---|
| Compound A | 1 |
| Compound B | 0.5 |
| Diatomaceous earth | 98.5 |

This composition is applied as a dust suitable for use in accordance with the invention.

Example X

Tests were carried out using the larvae of arrowhead scale (*Unaspis yanonensis Kuwana*) as test insects. Citrus leaves infested with arrowhead scales were picked from the plants and both cut edges of leaf sections were placed on pads of wet absorbent cotton in petri dishes. Compound A and Compound B were sprayed respectively on the leaf sections each as an aqueous emulsion at a concentration of 0.05% of the active ingredient, then the treated leaves were held in a rearing room controlled at 20° C. and 70% relative humidity. Mortality counts were made 13 days after treatment.

| | No. of larvae before treatment | No. of dead larvae | Percent mortality |
|---|---|---|---|
| Compound A | 210 | 210 | 100 |
| Compound B | 195 | 195 | 100 |
| Untreated | 200 | 11 | 5.5 |

Example XI

Insecticidal activities with respect to adult arrowhead scales were tested. Female adults were provided for this experiment, and the method of Example X was employed. The mortality counts were examined 22 days after application.

| | No. of adults before treatment | No. of dead adults | Percent mortality |
|---|---|---|---|
| Compound A | 42 | 41 | 97.6 |
| Compound B | 48 | 47 | 97.9 |
| Untreated | 30 | 4 | 13.3 |

Example XII

Adults of arrowhead scales were used in the test. Potted mandarin orange seedlings, infested with the scale, were test plants. Samples were sprayed respectively on the seedlings as an aqueous dispersion at a concentration of 0.05%, then they were kept in a greenhouse during the test period.

| | No. of leaves | Percent of leaves infested with adults (before spraying) | Percent of leaves infested with emerged larvae (after spraying) | |
|---|---|---|---|---|
| | | | 13 days | 30 days |
| Compound A | 46 | 84.4 | 3.8 | 4.5 |
| Compound B | 32 | 80.4 | 4.4 | 4.4 |
| Untreated | 18 | 88.8 | 100 | 100 |

Example XIII

The tests were carried out against cabbage aphid (*Brevicoryne brassicae L.*). Cabbages infested with cabbage aphids were treated by spraying on 0.25% aqueous emulsion of the sample. The aphid counts were taken after 1 day and 2 days.

| | Percent mortality (days after treatment) | |
|---|---|---|
| | 1 day | 2 days |
| Compound A | 93 | 100 |
| Compound B | 89 | 100 |
| Untreated | 0 | 0 |

Example XIV

Activity with respect to female adults of Green rice leaf hoppers (*Nephotettix apicalis cincticeps U.*) was examined. Samples were sprayed on rice seedlings, carrying the hoppers, as an aqueous dispersion at a concentration of 0.01%. The mortality counts were observed after 3 hours and 24 hours.

| | Percent mortality (Hours after treatment) | |
|---|---|---|
| | 3 hrs. | 24 hrs. |
| Compound A | 80 | 100 |
| Compound B | 68 | 93 |
| Untreated Control | 0 | 0 |

Example XV

Acaricidal activity with respect to the two spotted spider mite (*Tetranychus teralius L.*) was tested. Young kidney bean plants each potted in a 6-cm. pot were used in this experiment. Each twenty adult female mites were replaced on the plant, and they were kept in a greenhouse for 24 hours. Then samples were sprayed on these plants each as an aqueous dispersion.

| | Concentration of aquatic dispersion (percent) | Test No. | Percent mortality in 1 day |
|---|---|---|---|
| Compound A | 0.0125 | I | 100 |
| | | II | 100 |
| Compound B | 0.003 | I | 100 |
| | | II | 100 |
| Compound B | 0.0125 | I | 100 |
| | | II | 100 |
| | 0.003 | I | 100 |
| Untreated | | II | 100 |
| | | | 0 |

Example XVI

Tests on citrus red mite (*Panonichus citri L.*) were carried out. Seedlings of mandarine orange were hydroponically cultivated in an aquatic dispersion of the sample for one day, then they were transplanted in a soil pot. Each 30 citrus red mites were replaced on these plants.

| | Concentration of the aquatic dispersion (p.p.m.) | Percent mortality in 1 day | Percent mortality in 4 days |
|---|---|---|---|
| Compound A | 100 | 100 | |
| | 25 | 100 | |
| | 5 | 76.7 | 86.7 |
| Compound B | 100 | 100 | |
| | 25 | 100 | |
| | 5 | 66.6 | 83.3 |
| Untreated | | 0 | 0 |

What we claim is:

1. A compound having the formula $$\begin{array}{c}RO\\ \diagdown\\ R'O\end{array}\!\!\!\!\begin{array}{c}S\\ \|\\ P\\ \diagup\end{array}\!\!\!-S-CH_2-CH_2-NH-\underset{\underset{O}{\|}}{C}-CH_3$$

wherein R and R' each represents a lower alkyl radical.

2. O,O-dimethyl S- [2-(acetamido)ethyl] phosphorodithioate.

3. O.O-diethyl S- [2-(acetamido)ethyl] phosphorodithioate.

References Cited

UNITED STATES PATENTS 2,566,129   8/1951   Hook et al. _____ 260—944
3,205,253   9/1965   Fancher et al. _____ 260—944

CHARLES B. PARKER, *Primary Examiner.*

B. BILLIAN, *Assistant Examiner.*